*3,030,357*
*Patented Apr. 17, 1962*

3,030,357
16-AMINOMETHYLENE-17-OXO STEROIDS AND PREPARATION THEREOF
Raymond O. Clinton, East Greenbush, N.Y., assignor to Sterling Drug Inc., New York, N.Y., a corporation of Delaware
No Drawing. Filed Jan. 29, 1960, Ser. No. 5,343
30 Claims. (Cl. 260—239.5)

This invention relates to steroids and in particular is concerned with 16-(1-aminoalkylidene)-substituted 17-oxo-steroids and the preparation thereof.

The compounds of the invention are defined as 17-oxo-steroids having from seventeen to about twenty-three carbon atoms exclusive of ester radicals and being further substituted in the 16-position by the grouping =C(R)—N=B, wherein N=B is a basic amino radical, and R represents hydrogen or a lower-alkyl radical.

The exact nature of the steroid moiety is not critical. The utility of steroids, including those exhibiting hormonal or other pharmacological or endocrinological properties, is well known. Such steroid moieties have from seventeen to about twenty-three carbon atoms, not counting carbon content which may be provided by esterified hydroxy groups. Esterified hydroxy-steroids are included within the scope of the invention, but the carbon content contributed by the acid moiety of the ester is not considered part of the essential carbon content of the steroid.

The steroid moiety can be any member of the estrane, androstane or etiocholane series. The foregoing can contain varying degrees of unsaturation and a variety of substituents in the form of hydrocarbon radicals or functional groups conventionally employed in the steroid art. The steroid moiety can have one or more substituents at various positions of the nucleus, for example, hydroxy, mercapto, acyloxy or oxo radicals at positions 1, 2, 3, 4, 5, 6, 7, 11, 12 or 14; halogen atoms, preferably fluorine, chlorine or bromine, for example, at the 2-, 4-, 6-, 7-, 9- or 12-positions; epoxy bridges, for example, at the 4,5-, 5,6- or 9,11-positions, and lower-alkyl groups, for example, at the 1-, 2-, 3-, 4-, 6-, 7- or 11-positions. The steroid moiety can also have one or more double bonds, especially at the 1,2-, 4,,5-, 5,6-, 6,7- or 9,11-positions, and compounds where ring A or both rings A and B are aromatic are also contemplated. The steroid moiety usually possesses angular methyl groups at $C_{10}$ and $C_{13}$, although 18- and 19-nor-steroids and 18,19-bisnor-steroids lacking one or both of the angular methyl groups at $C_{13}$ and $C_{10}$, respectively, are also contemplated.

The 18,19-bisnor-steroid, 18- or 19-nor-steroid, and normal steroid moieties in the compounds of the invention contain respectively, seventeen, eighteen and nineteen carbon atoms plus any carbon content which may be provided by one or more nuclearly substituted hydrocarbon radicals, up to and including a total of about twenty-three carbon atoms.

When acyloxy radicals are present in the steroid moiety, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids such as phosphoric acid are also contemplated.

In the 16-(1-aminoalkylidene) substituent, =C(R)—N=B, the portion N=B stands for primary amino ($H_2N$) or a basic secondary or tertiary amino radical having a molecular weight less than about 200. By a secondary amino radical is meant a radical of the type YHN— wherein Y is an organic substituent so that the complete molecule to which it is attached is a secondary amine. By a tertiary amino radical is meant a radical of the type YY'N— wherein Y and Y' are both organic substituents so that the complete molecule to which it is attached is a tertiary amine. Basic amino radicals are those of the aliphatic or araliphatic type that impart to the molecules which contain them sufficient basicity so that the compounds readily form acid-addition salts with strong inorganic and organic acids. A particularly preferred group of amino radicals are primary amino ($H_2N$); lower-alkylamino, for example, methylamino and ethylamino; cycloalkylamino in which the cycloalkyl has from 3 to 7 ring members, for example, cyclopropylamino, cyclopentylamino, cyclohexylamino and cycloheptylamino; phenyl-lower-alkylamino, for example, benzylamino and phenylethylamino; di-lower-alkylamino, for example, dimethylamino and diethylamino; dicycloalkylamino in which cycloalkyl has from 3 to 7 ring members, for example, dicyclopentylamino and dicyclohexylamino; N-(cycloalkyl)-lower-alkylamino in which the cycloalkyl has from 3 to 7 ring members, for example, N-methylcyclohexylamino and N-ethylcyclopentylamino; polymethylenimino having from 5 to 7 ring members, for example, 1-pyrrolidyl, 1-piperidyl, hexamethylenimino and lower-alkylated derivatives thereof; 4-morpholinyl; di-(phenyl-lower-alkyl)amino, for example, dibenzylamino and bis(phenylethyl)amino; N - (phenyl-lower-alkyl)-lower-alkylamino, for example, N-benzylmethylamino; di-lower-alkylamino-lower-alkylamino, for example, di-methylaminoethylamino; and polymethylenimino-lower-alkylamino, for example, 1-piperidylethylamino. In the foregoing radicals, the term lower-alkyl stands for alkyl groups containing from one to about six carbon atoms with the additional proviso that in the di-lower-alkyl-amino-lower-alkylamino and polymethylenimino-lower-alkylamino radicals, the two nitrogens are separated by at least two carbon atoms.

The compounds of the invention are prepared by reacting a 16-(1-hydroxyalkylidene)-17-oxo-steroid with ammonia or a basic amine, HN=B, according to the following equation:

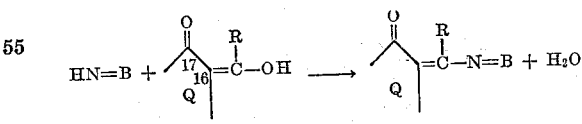

wherein Q represents the remaining portion of the steroid moiety described above. The condensation takes place by heating the 16-(1-hydroxyalkylidene)-17-oxo-steroid with at least one molar equivalent of HN=B in an inert solvent or reaction medium at a temperature between about 50° C. and 150° C. The nature of the inert solvent is not critical, although hydrocarbon solvents such as benzene, toluene or xylene, or lower-alkanols, e.g., ethanol are preferred.

A particularly preferred group of compounds comprises 16-(1-aminoalkylidene)-17-oxo-steroids of the androstane or etiocholane series, in which the steroid moiety has from seventeen to about twenty-three carbon atoms exclusive of ester radicals, including those having the structural formula

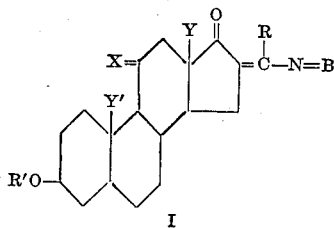

I wherein R represents hydrogen or lower-alkyl; R' represents hydrogen or carboxylic acyl; X represents $H_2$, (H)(OH) or O; Y and Y' represent hydrogen or methyl, and N=B represents unsubstituted amino, or secondary or tertiary amino having a molecular weight less than about 200. Also contemplated are the corresponding compounds having a double bond in the 5,6-position:

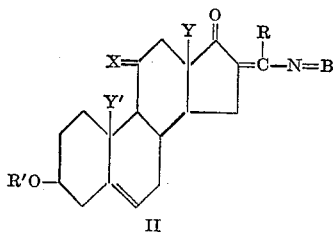

II

Another particularly preferred group of compounds comprises 16-(1-aminoalkylidene)-17-oxo-steroids of the estrane series, in which the steroid moiety has from seventeen to about nineteen carbon atoms exclusive of ester radicals, including those having the structural formula

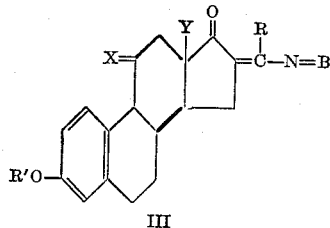

III wherein R, X, Y and N=B have the same meanings as given above, and R' represents hydrogen, lower-alkyl or carboxylic acyl.

Still another particularly preferred group of compounds comprises 2,16-bis(1-aminoalkylidene)-3,17-dioxo-steroids in which the steroid moiety has from seventeen to about twenty-one carbon atoms exclusive of ester radicals including those having the structural formula

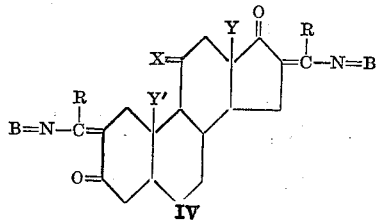

IV wherein R, X, Y, Y' and N=B have the same meanings as given above, including the corresponding compounds having a double bond in the 4,5-position:

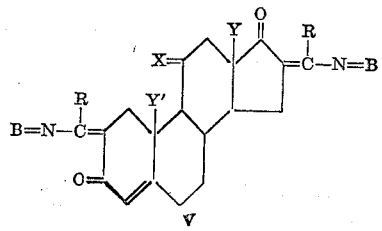

V

The compounds of Formulas I, II and III are prepared by reacting the appropriate 16-(1-hydroxyalkylidene)-17-oxo-steroid, viz.:

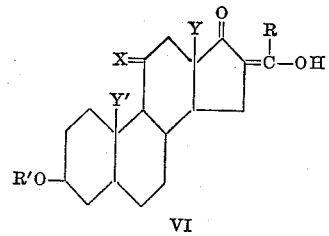

VI

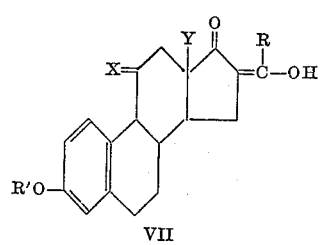

VII or a $\Delta^5$-unsaturated analog of VI, with ammonia or an amine, HN=B; R, R', X, Y, Y' and N=B have the same meanings given above.

The 2,16-bis(1-aminoalkylidene)-3,17-dioxo-steroids exemplified by Formulas IV and V are prepared by reacting the appropriate 2,16-bis(1-hydroxyalkylidene)-3,17-dioxo-steroid with ammonia or an amine, HN=B, at least two molar equivalents of the amine being used relative to the steroid. The intermediates for compounds of Formula IV have the following structure:

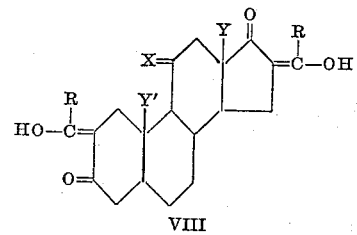

VIII

R, X, Y and Y' having the same meanings given above. The corresponding $\Delta^4$-unsaturated compounds lead to compounds of Formula V.

16-(1-aminoalkylidene)-17-oxo-steroids having a 3-oxo substituent, viz.:

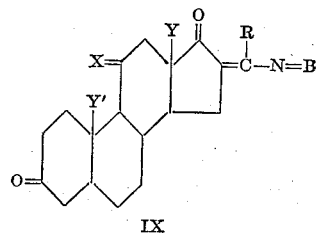

IX and the corresponding $\Delta^4$-unsaturated compounds, wherein R, R', X, Y, Y' and N=B have the same meanings given hereinabove, are also within the scope of the invention but cannot be prepared directly from the parent 3,17-dioxo-steroid because of the reactivity of the 3-oxo substituent. Compounds of Formula IX can, however, be synthesized as follows. A compound of Formula I or II where R' represents hydrogen is oxidized by means of reagents conventionally used to oxidize carbocyclic hydroxy groups to oxo groups, e.g., chromic oxide or the reagents of the Oppenauer procedure (a volatile ketone and the aluminum salt of an organic hydroxy compound).

Alternatively, one can start with a steroid of the type:

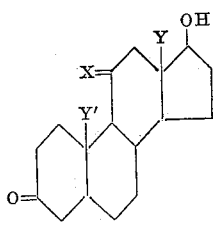

or a ring unsaturated analog thereof. The 3-oxo group is protected as a ketal derivative and the 17-hydroxy group then oxidized under non-acidic conditions as by chromic oxide in pyridine. The resulting 17-oxo-3-ketal, as illustrated by the structure

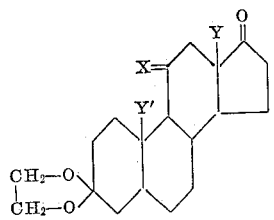

is then subjected to the reactions previously described to introduce a hydroxyalkylidene group in the 16-position. The resulting compound is reacted with an amine, HN=B, and the ketal is finally cleaved with dilute acid to give a compound of Formula IX. An oxo group at the 11-position (X=O) is relatively unreactive and need not be protected before introduction of the hydroxyalkylidene group or reaction with an amine.

The intermediate 16-hydroxyalkylidene-17-oxo-steroids (I) are prepared by condensing the appropriate 17-oxo-steroid with a lower-alkyl lower alkanoate, RCOOR'', wherein R represents hydrogen or lower-alkyl and R'' represents lower-alkyl, in the presence of a strong base under anhydrous conditions. The strong base is preferably an alkali metal lower-alkoxide, amide or hydride. An acyl group enters the 16-position with elimination of a molecule of an alcohol as follows:

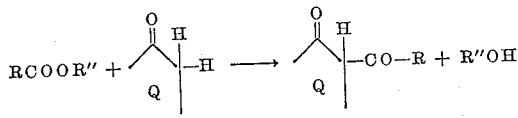

The 16-acyl steroid in solution is in tautomeric equilibrium with its enol form (hydroxyalkylidene, =C(R)—OH)

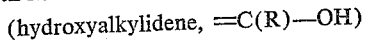

and the latter form is the one chosen for convenience in the structural formulas given elsewhere in this specification.

In the case wherein the radical R represents lower-alkyl an alternative and preferred method comprises treating the 17-oxo-steroid with a lower-alkanoic acid anhydride in the presence of boron trifluoride.

In the event that the starting material contains a 3-oxo radical as well as a 17-oxo radical, the hydroxyalkylidene group also enters the 2-position to give a 2,16-bis(1-hydroxyalkylidene)-3,17-dioxo-steroid, exemplified by Formula VIII above, intermediates for the 2,16-bis-(aminoalkylidene) compounds of Formula IV.

The intermediate 16-(1-hydroxyalkylidene)-17-oxo-steriods and 2,16-bis(1-hydroxyalkylidene)-3,17-dioxo-steroids are disclosed in my copending application, Serial No. 835,434, filed August 24, 1959.

The compounds of the invention are basic in character and will form acid-addition salts upon addition of strong acids. Those compounds which are tertiary-amines will also form quaternary ammonium salts upon addition of esters of strong acids. These salts are the full equivalent of the corresponding free bases insofar as their physiological properties are concerned. Both the free base and salt forms are considered to be one and the same invention.

The acid-addition salts are prepared by causing the 16-(1-aminoalkylidene)-steroid to react with a strong inorganic or organic acid, usually in an inert solvent or reaction medium. Examples of appropriate acids include hydrochloric, hydrobromic, sulfuric, phosphoric, citric, tartaric, quinic, benzenesulfonic acid, and the like.

The quaternary ammonium salts of the compounds of the invention are prepared by causing a 16-(1-tertiary-aminoalkylidene)-steroid to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the 16-(1-tertiary-aminoalkylidene)-steroid and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the 16-(1-aminoalkylidene)-steroid, and serve as intermediates for non-toxic quaternary salts by conventional ion exchange reactions. All acid-addition salts, regardless of the nature of the anions, are useful as intermediates in the purification of the free bases.

Endocrinological studies of the compounds of the invention have shown that they possess useful metabolic, hormonal and anti-hormonal properties. In particular, they exhibit pituitary inhibiting activity. Pituitary inhibiting agents are useful in the treatment of endocrinological disorders brought about by hormonal imbalance.

Pharmacological evalution has demonstrated that compounds of the invention also possess hypotensive properties thus indicating their usefulness in lowering blood pressure.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

*Example 1*

16 - [(1-piperidyl)methylene]androstan - 3β - ol - 17-one [I; R is H, R' is H, X is H₂, Y and Y' are CH₃, N=B is N(CH₂)₅].

A mixture of 1.59 g. of 16-hydroxymethyleneandrostan-3β-ol-17-one, 0.6 ml. of piperidine and 40 ml. of benzene was refluxed for two hours in a Bidwell-Sterling moisture trap apparatus to collect the water formed in the reaction. The reaction mixture was concentrated in vacuo, and the residue was triturated with ether, giving 1.89 g. of crystalline product, M.P. 197–199° C. (uncorr.). Recrystallization of the latter from benzene and from an ethyl acetate-ether mixture, and drying at 50° C. for nine hours in vacuo, gave 16-[(1-piperidyl)methylene]androstan-3β-ol-17-one in the form of pale yellow prisms, MP. 199.5–202.7° C. (corr.), $[\alpha]_D^{25} = +63.4°$ ±0.5° (1% in chloroform); ultraviolet maximum at 320 mμ (E=25,700)

*Analysis.*—Calcd. for $C_{25}H_{39}NO_2$: C, 77.86; H, 10.20; N, 3.63. Found: C, 77.92; H, 10.08; N, 3.64.

In many cases where the reaction between the steroid and amine is relatively rapid, the use of a water separator is not necessary. The reaction can be carried to completion by distilling or boiling off the benzene reaction mixture which removes azeotropically the water formed in the reaction.

16 - [(1 - piperidyl)methylene]androstan - 3β - ol - 17-one reacts with hydrochloric acid, hydrobromic acid, sulfuric acid, phosphoric acid, tartaric acid, quinic acid, naphthalenesulfonic acid, methyl iodide, ethyl bromide, allyl bromide, benzyl chloride, or 2-chlorobenzyl chloride to give the hydrochloride, hydrobromide, sulfate (or bisulfate), phosphate (or acid phosphate), tartrate (or bitartrate), quinate, naphthalenesulfonate, methiodide, ethobromide, allobromide, benzochloride, or 2-chlorobenzochloride salts, respectively.

16 - [(1 - piperidyl)methylene]androstan - 3β - ol - 17-one can be reacted with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, or cinnamoyl chloride, by heating in the presence of pyridine, to give, respectively, 3β-acetoxy-16-[(1-piperidyl)methylene]androstan - 17 - one, 3β - propionoxy - 16 - [(1 - piperidyl)methylene]androstan - 17-one, 3β - caproyloxy - 16 - [(1 - piperidyl)methylene]-androstan - 17 - one, 3β - (β - carboxypropionoxy) - 16 - [(1 - piperidyl)methylene]androstan - 17 - one, 3β - (β-cyclopentylpropionoxy) - 16 - [(1 - piperidyl)methylene]-androstan - 17 - one, 3β - benzoyloxy - 16 - [(1 - piperidyl)methylene]androstan - 17 - one, 3β - (p - nitrobenzoyloxy) - 16 - [(1 - piperidyl)methylene]androstan - 17-one, 3β - (3,4,5 - trimethoxybenzoyloxy) - 16 - [(1-piperidyl)methylene]androstan - 17 - one, 3β - phenylacetoxy - 16 - [(1 - piperidyl)methylene]androstan - 17-one, or 3β - cinnamoyloxy - 16 - [(1 - piperidyl)methylene]-androstan-17-one.

*Example 2*

16 - [(1 - piperidyl)methylene]androstane - 3,17 - dione [IX; R is H, X is $H_2$, Y and Y' are $CH_3$, N=B is $N(CH_2)_5$] can be prepared by oxidation of 16-[(1-piperidyl)methylene]androstan-3β-ol-17-one (Example 1) with chromic oxide in acetic acid solution. The reaction takes place readily at room temperature or lower over a period of several hours, and the product is isolated by dilution with water and collection of the precipitated product by filtration.

*Example 3*

16 - [(n - hexyl)aminomethylene]androstan - 3β - ol - 17-one [I; R is H, R' is H, X is $H_2$, Y and Y' are $CH_3$, N=B is $NH(CH_2)_5CH_3$] can be prepared by replacing the piperidine in Example 1 by a molar equivalent amount of n-hexylamine.

*Example 4*

16 - (benzylaminomethylene)androstan - 3β - ol - 17-one [I; R is H, R' is H, X is $H_2$, Y and Y' are $CH_3$, N=B is $NHCH_2C_6H_5$] can be prepared by replacing the piperidine in Example 1 by a molar equivalent amount of benzylamine.

*Example 5*

16 - (cyclopropylaminomethylene)androstan - 3β - ol-17-one [I; R is H, R' is H, X is $H_2$, Y and Y' are $CH_3$, N=B is $NHCH(CH_2)_2$] can be prepared by replacing the piperidine in Example 1 by a molar equivalent amount of cyclopropylamine.

*Example 6*

16 - (cycloheptylaminomethylene) androstan - 3β - ol-17-one [I; R is H, R' is H, X is $H_2$ Y and Y' are $CH_3$, N=B is $NHCH(CH_2)_6$] can be prepared by replacing the piperidine in Example 1 by a molar equivalent amount of cycloheptylamine.

*Example 7*

16 - (dicyclohexylaminomethylene)androstan - 3β - ol-17-one [I; R is H, R' is H, X is $H_2$ Y and Y' are $CH_3$, N=B is $N(C_6H_{11})_2$] can be prepared by replacing the piperidine in Example 1 by a molar equivalent amount of dicyclohexylamine.

*Example 8*

16 - [(2 - methyl - 1 - piperidyl)methylene]androstan-3β-ol-17-one [I; R is H, R' is H, X is $H_2$, Y and Y' are $CH_3$, N=B is 2-methyl-1-piperidyl] can be prepared by replacing the piperidine in Example 1 by a molar equivalent amount of 2-methylpiperidine.

*Example 9*

16 - [(4 - morpholinyl)methylene]androstan - 3β -ol-17-one [I; R is H, R' is H, X is $H_2$, Y and Y' are $CH_3$, N=B is $N(CH_2)_4O$] can be prepared by replacing the piperidine in Example 1 by a molar equivalent amount of morpholine.

*Example 10*

16 - [N - (cyclohexyl)methylaminomethylene]androstan-3β-ol-17-one [I; R is H, R' is H, X is $H_2$, Y and Y' are $CH_3$, N=B is $N(C_6H_{11})(CH_3)$] can be prepared by replacing the piperidine in Example 1 by a molar equivalent amount of N-(cyclohexyl)methylamine.

*Example 11*

16 - [N - (benzyl)methylaminomethylene]androstan-3β-ol-17-one [I; R is H, R' is H, X is $H_2$, Y and Y' are $CH_3$, N=B is $N(CH_3)(CH_2C_6H_5)$] can be prepared by replacing the piperidine in Example 1 by a molar equivalent amount of N-(benzyl)methylamine.

*Example 12*

16 - [β - (3,4 - dimethoxyphenyl)ethylaminomethylene]androstan-3β-ol-17-one [I; R is H, R' is H, X is $H_2$, Y and Y' are $CH_3$, N=B is $HNCH_2CH_2C_6H_3(OCH_3)_2$-3,4] can be prepared by replacing the piperidine in Example 1 by a molar equivalent amount of β-(3,4-dimethoxyphenyl)ethylamine.

*Example 13*

16 - [β - hydroxy - β - (4 - hydroxyphenyl)ethylaminomethylene]androstan-3β-ol-17-one [I; R is H, R' is H, X is $H_2$, Y and Y' are $CH_3$, N=B is

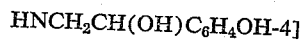

can be prepared by replacing the piperidine in Example 1 by a molar equivalent amount of β-hydroxy-β-(4-hydroxyphenyl)ethylamine.

*Example 14*

16-aminomethyleneandrostan-3β-ol-17-one [I; R is H, R' is H, X is $H_2$, Y and Y' are $CH_3$, N=B is $NH_2$] can be prepared by treating a solution of 16-hydroxymethyleneandrostan-3β-ol-17-one in chloroform with dry ammonia gas at room temperature until saturated. After standing for several hours, the product is obtained by concentration of the solution.

*Example 15*

16 - [2 - (1 - pyrrolidyl)ethylaminomethylene]androstan-3β-ol-17-one [I; R is H, R' is H, X is $H_2$, Y and Y' are $CH_3$, N=B is $HNCH_2CH_2N(CH_2)_4$] can be prepared by replacing the piperidine in Example 1 by a molar equivalent amount of 2-(1-pyrrolidyl)ethylamine.

Example 16

16 - (di - n - butylaminomethylene)androstan - 3β - ol - 17-one [I; R is H, R' is H, X is $H_2$, Y and Y' are $CH_3$, N=B is $N(n-C_4H_9)_2$] can be prepared by replacing the piperidine in Example 1 by a molar equivalent amount of di-n-butylamine.

Example 17

16 - (dibenzylaminomethylene)androstan - 3β - ol - 17 - one [I; R is H, R' is H, X is $H_2$, Y and Y' are $CH_3$ N=B is $N(C_6H_5CH_2)_2$] can be prepared by replacing the piperidine in Example 1 by a molar equivalent amount of dibenzylamine.

Example 18

16 - [(1 - pyrrolidyl)methylene]etiocholan - 3α - ol - 11,17-dione [I; R is H, R' is H, X is O, Y and Y' are $CH_3$, N=B is $N(CH_2)_4$] was prepared from 4.00 g. of 16-hydroxymethyleneetiocholan-3α-ol-11,17-dione and 2.5 ml. of pyrrolidine in 150 ml. of benzene according to the manipulative procedure described above in Example 1. There was thus obtained 4.56 g. of product, M.P. 238–241° C. (uncorr.), which when recrystallized from ethyl acetate and twice from benzene and dried at 130° C. in vacuo for eight hours gave 16-[(1-pyrrolidyl)methylene]-etiocholan-3α-ol-11,17-dione in the form of pale yellow prisms, M.P. 240.2–244.0° C. (dec.) (corr.), $$[\alpha]_D^{25} = +17.5° \pm 0.2°$$

(1% in chloroform); ultraviolet maximum at 328 mμ (E=28,743).

*Analysis.*—Calcd. for $C_{24}H_{35}NO_3$: C, 74.76; H, 9.15; N, 3.63. Found: C, 74.95; H, 9.11; N, 3.64.

Example 19

16 - [(1 - pyrrolidyl)methylene] - 5 - androsten - 3β - ol-17-one [II; R is H, R' is H, X is $H_2$, Y and Y' are $CH_3$, N=B is $N(CH_2)_4$] was prepared from 6.32 g. of 16-hydroxymethylene-5-androsten-3β-ol-17-one and 4.0 g. of pyrrolidine in 150 ml. of benzene according to the manipulative procedure described above in Example 1. There was thus obtained 7.00 g. of product, M.P. 252–257° C. (uncorr.), which when recrystallized from absolute ethanol and dried at 100–110° C. in vacuo for eight hours gave 16-[(1-pyrrolidyl)methylene]-5-androsten-3β-ol-17-one in the form of pale yellow leaflets, M.P. 254.6–259.2° (dec.) (corr.), $[\alpha]_D^{25} = -105.9° \pm 0.4°$ (1% in chloroform); ultraviolet maximum at 328 mμ (E=28,274).

*Analysis.*—Calcd. for $C_{24}H_{35}NO_2$: C, 78.00; H, 9.55; N, 3.79. Found: C, 77.80; H, 9.38; N, 3.80.

Example 20

16 - [(1 - pyrrolidyl)methylene]androstan - 3β - ol - 17-one [I; R is H, R' is H, X is $H_2$, Y and Y' are $CH_3$, N=B is $N(CH_2)_4$] was prepared from 15.92 g. of 16-hydroxymethyleneandrostan-3β-ol-17-one and 8.3 ml. of pyrrolidine in 750 ml. of benzene according to the manipulative procedure described above in Example 1. There was thus obtained 18.07 g. of product, M.P. 206–208° C. (uncorr.), which when recrystallized from benzene and from ethyl acetate and dried at 130° C. in vacuo for eight hours gave 16-[(1-pyrrolidyl)methylene]-androstan-3β-ol-17-one in the form of pale yellow prisms, M.P. 206.6–209.4° C. (corr.), $[\alpha]_D^{25} = -36.7° \pm 0.3°$ (1% in chloroform); ultraviolet maximum at 328 mμ (E=28,550).

*Analysis.*—Calcd. for $C_{24}H_{37}NO_2$: C, 77.57; H, 10.04; N, 3.77. Found: C, 77.44; H, 9.72; N, 3.72.

Example 21

16 - (dimethylaminomethylene)androstan - 3β - ol - 17 - one [I; R is H, R' is H, X is $H_2$, Y and Y' are $CH_3$, N=B is $N(CH_3)_2$].

A solution of 5.0 g. of 16-hydroxymethyleneandrostan-3β-ol-17-one in 200 ml. of benzene was cooled to 10° C. Anhydrous dimethylamine (5.0 ml.) was added, and the mixture was stirred and allowed to warm at room temperature. The reaction mixture was slowly heated on a steam bath, refluxed for ten minutes and cooled with stirring, whereupon there separated 3.66 g. of product, M.P. 272–277° C. (uncorr.). The latter was collected and recrystallized from a methanol-ethyl acetate mixture and then from methanol alone, and dried at 100° C. for twenty-four hours in vacuo over phosphorus pentoxide to give 16 - (dimethylaminomethylene)androstan - 3β - ol - 17-one, M.P. 275.6–283.2° C. (corr.), $$[\alpha]_D^{23} = +53.0° \pm 0.4°$$

(1% in chloroform); ultraviolet maximum at 319 mμ (E=16,800).

*Analysis.*—Calcd. for $C_{22}H_{35}NO_2$: C, 76.47; H, 10.21; N, 4.05. Found: C, 76.26; H, 10.13; N, 3.98.

Example 22

16 - (cyclohexylaminomethylene)androstan - 3β - ol - 17-one [I; R is H, R' is H, X is $H_2$, Y and Y' are $CH_3$, N=B is $NHCH(CH_2)_5$] was prepared from 15.2 g. of 16-hydroxymethyleneandrostan-3β-ol-17-one and 9.52 g. of cyclohexylamine in 500 ml. of benzene according to the manipulative procedure described above in Example 1. The crude product was dissolved in benzene and chromatographed on a column of 700 g. of alumina. The column was eluted with benzene and then with benzene containing increasing quantities of ether. There was thus obtained 17.33 g. of product, M.P. 169–171° C. (uncorr.), which when recrystallized from ethanol gave 16-(cyclohexylaminomethylene)androstan-3β-ol-17-one containing one molecule of ethanol of crystallization, M.P. indefinite, starting at 126.4° C., $[\alpha]_D^{23} = -38.3°$ (1% in chloroform); ultraviolet maximum at 318 mμ (E=25,700).

*Analysis.*—Calcd. $C_{26}H_{41}NO_2 \cdot C_2H_5OH$: C, 75.46; H, 10.63; N, 3.14; O, 9.89. Found: C, 75.25; H, 10.50; N, 3.08; O, 9.77.

Example 23

16 - [(2 - diethylaminoethylamino)methylene]androstan-3β-ol-17-one [I; R is H, R' is H, X is $H_2$, Y and Y' are $CH_3$, N=B is $NHCH_2CH_2N(C_2H_5)_2$] was repared from 3.30 g. of 16-hydroxymethyleneandrostan-3β-ol-17-one and 1.26 g. of 2-diethylaminoethylamine in 200 ml. of benzene according to the manipulative procedure described above in Example 1. The product was recrystallized successively from methanol, ethyl acetate and methanol and dried at 90° C. in vacuo to give 16-[(2-diethylaminoethylamino)methylene]androstan - 3β - ol - 17-one, M.P. 173.0–176.8° C. (corr.), $[\alpha]_D^{25} = -40.6° \pm 0.5°$ (1% in chloroform); ultraviolet maximum at 315 mμ (E=24,900).

*Analysis.*—Calcd. for $C_{26}H_{44}N_2O_2$: C, 74.95; H, 10.65; N, 6.72. Found: C, 75.25; H, 10.52; N, 6.60.

Example 24

16 - [2 - (4 - morpholinyl)ethylaminomethylene]-androston-3β-ol-17-one [I; R is H, R' is H, X is $H_2$, Y and Y' are $CH_3$, N=B is $NHCH_2CH_2N(CH_2)_4O$] was prepared from 3.30 g. of 16-hydroxymethyleneandrostan-3β-ol-17-one and 1.42 g. of 2-(4-morpholinyl)-ethylamine in 300 ml. of benzene according to the manipulative procedure described above in Example 1. There was thus obtained 3.19 g. of product, M.P. 163–178° C. (uncorr.), which was chromatographed on 160 g. of alumina, eluted with ether-methanol (99:1), recrystallized three times from ethyl acetate and dried to give 16-[2-(4-morpholinyl)ethylaminomethylene]androstan-3β-ol-17-one, M.P. 184.8–187.8° C. (corr.), $[\alpha]_D^{25} = -34.8° \pm 0.1°$ (1% in chloroform); ultraviolet maximum at 314 mμ (E=24,700).

*Analysis.*—Calcd. for $C_{26}H_{42}N_2O_3$: C, 72.52; H, 9.83; N, 6.51. Found: C, 72.60; H, 10.02; N, 6.45.

Example 25

16 - [(1 - hexamethylenimino)methylene]etiocholan-3α-ol-11,17-dione [I; R is H, R' is H, X is O, Y and Y' are $CH_3$, N=B is $N(CH_2)_6$] was prepared from 3.00 g. of 16 - hydroxymethyleneetiocholan - 3α - ol - 11,17-dione and 2.0 ml. of hexamethylenimine in 60 ml. of benzene according to the manipulative procedure described above in Example 1. The product was recrystallized from ethyl acetate and dried at 110° C. in vacuo for seven hours to give 16-[(1-hexamethylenimino)methylene]etiocholan-3α-ol-11,17-dione in the form of colorless needles, M.P. 193.2–195.2° C. (corr.), $[\alpha]_D^{25} = +78.6°$ (1% in chloroform); ultraviolet maximum at 324 mμ (E=29,200).

*Analysis.*—Calcd. for $C_{26}H_{39}NO_3$: C, 75.50; H, 9.51; N, 3.39. Found: C, 75.75; H, 9.76; N, 3.16.

Example 26

16 - (N -methylcyclohexylaminomethylene) - 5 - androsten-3β-ol-17-one [II; R is H, R' is H, X is $H_2$, Y and Y' are $CH_3$, N=B is $N(CH_3)(C_6H_{11})$] was prepared from 6.32 g. of 16-hydroxymethylene-5-androsten-3β-ol-17-one and 6.78 g. of N-methylcyclohexylamine in 300 ml. of benzene according to the manipulative procedure described above in Example 1. There was thus obtained 5.64 g. of 16-(N-methylcyclohexylaminomethylene)-5-androsten - 3β - ol - 17 - one, M.P. 222–227° C. (dec.) (uncorr.).

Example 27

2,16 - bis[(1 -pyrrolidyl)methylene] - 4 - androstene-3,17-dione [V; R is H, X is $H_2$, Y and Y' are $CH_3$, N=B is $N(CH_2)_4$].

A mixture of 3.0 g. of 2,16-bishydroxymethyl-4-androstene-3,17-dione, 1.5 g. of pyrrolidine and 600 ml. of benzene was refluxed for seventeen hours in a Bidwell-Sterling moisture trap apparatus to collect the water formed in the reaction. The reaction mixture was concentrated in vacuo, and the residue was triturated with ether, giving 3.67 g. of product, M.P. 250–258° C. (dec.) (uncorr.). Recrystallization of the latter from an ethyl acetate-methanol mixture and drying at 100° C. for five hours in vacuo gave 2,16-bis[(1-pyrrolidyl)methylene]-4-androstene-3,17-dione in the form of light yellow needles, M.P. 251.2–262.8° C. (dec.)(corr.), $[\alpha]_D^{25} = -245.3° \pm 0.2°$ (1% in chloroform); ultraviolet maxima at 249, 331 and 373 mμ (E=18,200, 32,900 and 16,300).

*Analysis.*—Calcd. for $C_{29}H_{40}N_2O_2$: C, 77.62; H, 8.99; N, 6.25. Found: C, 77.50; H, 9.20; N, 6.22.

2,16 - bis[(1 -pyrrolidyl)methylene] - 4 - androstene-3,17-dione reacts with hydrochloric acid, hydrobromic acid, sulfuric acid, phosphoric acid, tartaric acid, quinic acid, naphthalenesulfonic acid, methyl iodide, ethyl bromide, allyl bromide, benzyl chloride, or 2-chlorobenzyl chloride to give the hydrochloride, hydrobromide, sulfate (or bisulfate), phosphate (or acid phosphate), tartrate (or bitartrate), quinate, naphthalenesulfonate, methiodide, ethobromide, allobromide, benzochloride, or 2-chlorobenzochloride salts, respectively. If one molar equivalent of acid or ester is used with respect to the free base, a mono-acid-addition or mono-quaternary salt is obtained, whereas if two molar equivalents or more of acid or ester are used, a bis-acid-addition or bis-quaternary ammonium salt is obtained.

Example 28

2,16 - bis[(1 -piperidyl)methylene] - 4 - androstene-3,17-dione [V; R is H, X is $H_2$, Y and Y' are $CH_3$, N=B is $N(CH_2)_5$] can be prepared by replacing the pyrrolidine in Example 27 by a molar equivalent amount of piperidine.

Example 29

2,16 - bis[(n - hexyl)aminomethylene] - 4 - androstene-3,17-dione [V; R is H, X is $H_2$, Y and Y' are $CH_3$, N=B is $NH(CH_2)_5CH_3$] can be prepared by replacing the pyrrolidine in Example 27 by a molar equivalent amount of n-hexylamine.

Example 30

2,16 - bis(benzylaminomethylene) - 4 -androstene-3,17-dione [V; R is H, X is $H_2$, Y and Y' are $CH_3$, N=B is $NHCH_2C_6H_5$] can be prepared by replacing the pyrrolidine in Example 27 by a molar equivalent amount of benzylamine.

Example 31

2,16 - bis(cyclopropylaminomethylene) - 4 -androstene-3,17-dione [V; R is H, X is $H_2$, Y and Y' are $CH_3$, N=B is $NHCH(CH_2)_2$] can be prepared by replacing the pyrrolidine in Example 27 by a molar equivalent amount of cyclopropylamine.

Example 32

2,16 - bis(cycloheptylaminomethylene) - 4 - androstene-3,17-dione [V; R is H, X is $H_2$, Y and Y' are $CH_3$, N=B is $NHCH(CH_2)_6$] can be prepared by replacing the pyrrolidine in Example 27 by a molar equivalent amount of cycloheptylamine.

Example 33

2,16 - bis(dicyclohexylaminomethylene) - 4 - androstene-3,17-dione [V; R is H, X is $H_2$, Y and Y' are $CH_3$, N=B is $N(C_6H_{11})_2$] can be prepared by replacing the pyrrolidine in Example 27 by a molar equivalent amount of dicyclohexylamine.

Example 34

2,16 - bis[(2 - methyl - 1 - piperidyl)methylene] - 4-androstene-3,17-dione [V; R is H, X is $H_2$, Y and Y' are $CH_3$, N=B is 2-methyl-1-piperidyl] can be prepared by replacing the pyrrolidine in Example 27 by a molar equivalent amount of 2-methylpiperidine.

Example 35

2,16 - bis(di - n - butylaminomethylene) - 4 - androstene-3,17-dione [V; R is H, X is $H_2$, Y and Y' are $CH_3$, N=B is $N(n-C_4H_9)_2$] can be prepared by replacing the pyrrolidine in Example 27 by a molar equivalent amount of di-n-butylamine.

Example 36

2,16 - bis(dibenzylaminomethylene) - 4 - androstene-3,17-dione [V; R is H, X is $H_2$, Y and Y' are $CH_3$, N=B is $N(C_6H_5CH_2)_2$] can be prepared by replacing the pyrrolidine in Example 27 by a molar equivalent amount of dibenzylamine.

Example 37

2,16 - bis(dimethylaminomethylene) - 4 - androstene-3,17-dione [V; R is H, X is $H_2$, Y and Y' are $CH_3$, N=B is $N(CH_3)_2$] can be prepared by replacing the pyrrolidine in Example 27 by a molar equivalent amount of dimethylamine.

Example 38

2,16 - bis(cyclohexylaminomethylene) - 4 - androstene-3,17-dione [V; R is H, X is $H_2$, Y and Y' are $CH_3$, N=B is $NHCH(CH_2)_5$] can be prepared by replacing the pyrrolidine in Example 27 by a molar equivalent amount of cyclohexylamine.

Example 39

2,16 - bis[(2 - diethylaminoethylamino)methylene]-4-androstene-3,17-dione [V; R is H, X is $H_2$, Y and Y' are $CH_3$, N=B is $NHCH_2CH_2N(C_2H_5)_2$] can be prepared by replacing the pyrrolidine in Example 27 by a molar equivalent amount of 2-diethylaminoethylamine.

Example 40

2,16-bis[2 - (4 - morpholinyl)ethylaminomethylene]-4-androstene-3,17-dione [V; R is H, X is $H_2$, Y and Y' are $CH_3$, N=B is $NHCH_2CH_2N(CH_2)_4O$] can be prepared by replacing the pyrrolidine in Example 27 by a molar equivalent amount of 2-(4-morpholinyl)ethylamine.

Example 41

2,16-bis[(1-hexamethylenimino)methylene] - 4 - androstene-3,17-dione [V; R is H, X is $H_2$, Y and Y' are $CH_3$, N=B is $N(CH_2)_6$] can be prepared by replacing the pyrrolidine in Example 27 by a molar equivalent amount of hexamethylenimine.

Example 42

2,16-bis(aminomethylene)-4-androstene-3,17-dione [V; R is H, X is $H_2$, Y and Y' are $CH_3$, N=B is $NH_2$] can be prepared by treating a solution of 2,16-bis(hydroxymethylene)-4-androstene-3,17-dione in chloroform with dry ammonia gas at room temperature until saturated. After standing for several hours, the product is obtained by concentration of the solution.

Example 43

2,16 - bis[N - (cyclohexyl)methylaminomethylene]-4-androstene-3,17-dione [V; R is H, X is $H_2$, Y and Y' are $CH_3$, N=B is $N(CH_3)(C_6H_{11})$] can be prepared by replacing the pyrrolidine in Example 27 by a molar equivalent amount of N-(cyclohexyl)methylamine.

Example 44

2,16-bis[(4-morpholinyl)methylene]-4-androstene-3,17-dione [V; R is H, X is $H_2$, Y and Y' are $CH_3$, N=B is $N(CH_2)_4O$] can be prepared by replacing the pyrrolidine in Example 27 by a molar equivalent amount of morpholine.

Example 45

2,16-bis[N - (benzyl)methylaminomethylene]-4-androstene-3,17-dione [V; R is H, X is $H_2$, Y and Y' are $CH_3$, N=B is $N(CH_3)(CH_2C_6H_5)$] can be prepared by replacing the pyrrolidine in Example 27 by a molar equivalent amount of N-(benzyl)methylamine.

Example 46

2,16-bis[β - (3,4 - dimethoxyphenyl)ethylaminomethylene]-4-androstene-3,17-dione [V; R is H, X is $H_2$, Y and Y' are $CH_3$, N=B is $HNCH_2CH_2C_6H_3(OCH_3)_2$-3,4] can be prepared by replacing the pyrrolidine in Example 27 by a molar equivalent amount of β-(3,4-dimethoxyphenyl)ethylamine.

Example 47

2,16 - bis[β - hydroxy-β-(4-hydroxyphenyl)ethylaminomethylene]-4-androstene-3,17-dione [V; R is H, X is $H_2$, Y and Y' are $CH_3$, N=B is $HNCH_2CH(OH)C_6H_4OH$-4]

can be prepared by replacing the pyrrolidine in Example 27 by a molar equivalent amount of β-hydroxy-β-(4-hydroxyphenyl)ethylamine.

Example 48

16-[(1-piperidyl)methylene] - 1,3,5(10) - estratrien-3-ol-17-one [III; R is H, R' is H, X is $H_2$, Y is $CH_3$, N=B is $N(CH_2)_5$] can be prepared by replacing the 16-hydroxymethyleneandrostan-3β-ol-17-one in Example 1 by a molar equivalent amount of 16-hydroxymethylene-1,3,5(10)-estratrien-3-ol-17-one.

Example 49

16-[(1-piperidyl)methylene] - 18 - nor-1,3,5(10)-estratrien-3-ol-17-one [III; R is H, R' is H, X is $H_2$, Y is H, N=B is $N(CH_2)_5$] can be prepared by replacing the 16-hydroxymethyleneandrostan-3β-ol-17-one in Example 1 by a molar equivalent amount of 16-hydroxymethylene-18-nor-1,3,5(10)-estratrien-3-ol-17-one.

Example 50

16-[(1 - piperidyl)methylene]-1-methyl-1,3,5(10)-estratrien-3-ol-17-one can be prepared by replacing the 16-hydroxymethyleneandrostan-3β-ol-17-one in Example 1 by a molar equivalent amount of 16-hydroxymethylene-1-methyl-1,3,5(10)-estratrien-3-ol-17-one.

Example 51

16 - [(1 - piperidyl)methylene]-1,3,5(10),6,8-estrapentaen-3-ol-17-one can be prepared by replacing the 16-hydroxymethyleneandrostan-3β-ol-17-one in Example 1 by a molar equivalent amount of 16-hydroxymethylene-1,3,5(10),6,8-estrapentaen-3-ol-17-one.

Example 52

16-[(1 - piperidyl)methylene]-1,3,5(10),7-estratetraen-3-ol-17-one can be prepared by replacing the 16-hydroxymethyleneandrostan-3β-ol-17-one in Example 1 by a molar equivalent amount of 16-hydroxymethylene-1,3,5(10),7-estratetraen-3-ol-17-one.

Example 53

16 - [(1 - piperidyl)methylene]-1,3,5(10),6,8-estrapentaen-3,14-diol-17-one can be prepared by replacing the 16-hydroxymethyleneandrostan-3β-ol-17-one in Example 1 by a molar equivalent amount of 16-hydroxymethylene-1,3,5(10),6,8-estrapentaen-3,14-diol-17-one.

Example 54

16-[(1-piperidyl)methylene] - 3 - methoxy-1,3,5(10)-estratrien-17-one [III; R is H, R' is $CH_3$, X is $H_2$, Y is $CH_3$, N=B is $N(CH_2)_5$] can be prepared by replacing the 16-hydroxymethyleneandrostan-3β-ol-17-one in Example 1 by a molar equivalent amount of 16-hydroxymethylene-3-methoxy-1,3,5(10)-estratrien-17-one.

Example 55

16 - [(1 - piperidyl)methylene]-1,3,5(10)-estratrien-3-ol-11,17-dione [III; R is H, R' is H, X is O, Y is $CH_3$, N=B is $N(CH_2)_5$] can be prepared by replacing the 16-hydroxymethyleneandrostan-3β-ol-17-one in Example 1 by a molar equivalent amount of 16-hydroxymethylene-1,3,5(10)-estratrien-3-ol-11,17-dione.

Example 56

16-[1-(1-piperidyl)ethylidene] - 3 - acetoxy-1,3,5(10)-estratrien-17-one [III; R is $CH_3$, R' is $CH_3CO$, X is $H_2$, Y is $CH_3$, N=B is $N(CH_2)_5$] can be prepared by replacing the 16-hydroxymethyleneandrostan-3β-ol-17-one in Example 1 by a molar equivalent amount of 3-acetoxy-16-acetyl-1,3,5(10)-estratrien-17-one.

Example 57

16-[(1-piperidyl)methylene] - 5 - androstene - 1α,3β-diol-17-one can be prepared by replacing the 16-hydroxymethyleneandrostan-3β-ol-17-one in Example 1 by a molar equivalent amount of 16-hydroxymethylene-5-androstene-1α,3β-diol-17-one.

Example 58

16-[(1-piperidyl)methylene] - 4 - androstene - 3β,19-diol-17-one can be prepared by replacing the 16-hydroxymethyleneandrostan-3β - ol - 17 - one in Example 1 by a molar equivalent amount of 16-hydroxymethylene-4-androstene-3β,19-diol-17-one.

Example 59

16-[(1-piperidyl)methylene] - 3 - ethoxy - 3,5-androstadien-17-one can be prepared by replacing the 16-hydroxymethyleneandrostan-3β-ol-17-one in Example 1 by a molar equivalent amount of 16-hydroxymethylene-3-ethoxy-3,5-androstadien-17-one.

Example 60

16-[(1-piperidyl)methylene] - 3 - ethoxy - 19- nor-3,5-androstadien-17-one can be prepared by replacing the 16-hydroxymethyleneandrostan-3β-ol-17-one in Example 1 by a molar equivalent amount of 16-hydroxymethylene-3-ethoxy-19-nor-3,5-androstadien-17-one.

Example 61

16-[(1-piperidyl)methylene] - 3 - ethoxy - 3,5 - androstadien-11β-ol-17-one can be prepared by replacing the 16-hydroxymethyleneandrostan-3β-ol-17-one in Example 1 by a molar equivalent amount of 16-hydroxymethylene-3-ethoxy-3,5-androstadien-11β-ol-17-one.

Example 62

16[(1-piperidyl)methylene] - 4 - androsten - 11β - ol-3,17-dione [IX; R is H, X is (H) (OH), Y and Y' are CH₃, N=B is N(CH₂)₅] can be prepared by heating 16-[(1-piperidyl)methylene] - 3 - ethoxy - 3,5 - androstadien-11β-ol-17-one with dilute acetic acid.

Example 63

16[(1-piperidyl)methylene] - 3α - methylandrostan-3β-ol-17-one can be prepared by replacing the 16-hydroxymethyleneandrostan-3β-ol - 17 - one in Example 1 by a molar equivalent amount of 16-hydroxymethylene - 3α-methylandrostan-3β-ol-17-one.

Example 64

16[(1-piperidyl)methylene]etiocholane - 3α,12α - diol-17-one can be prepared by replacing the 16-hydroxymethyleneandrostan-3β-ol - 17 - one in Example 1 by a molar equivalent amount of 16-hydroxymethyleneetiocholane-3α,12α-diol-17-one.

Example 65

16-[(1-piperidyl)methylene] - 3 - mercapto - 5 - androsten-17-one can be prepared by replacing the 16-hydroxymethyleneandrostan-3β-ol-17 - one in Example 1 by a molar equivalent amount of 16-hydroxymethylene-3-mercapto-57-androsten-17-one.

Example 66

16[(1-piperidyl)methylene] - 5,7 - androstadien - 3-ol-17-one can be prepared by replacing the 16-hydroxymethyleneandrostan-3β-ol - 17 - one in Example 1 by a molar equivalent amount of 16-hydroxymethylene-5,7-androstadien-3-ol-17-one.

Example 67

16-[(1-piperidyl)methylene] - 9,(11) - etiocholen - 3α-ol-17-one can be prepared by replacing the 16-hydroxymethyleneandrostan-3β-ol-17-one in Example 1 by a molar equivalent amount of 16-hydroxymethylene-9(11)-etiocholen-3α-ol-17-one.

Example 68

16-[(1-piperidyl)methylene] - 9α - bromoetiocholane-3α,11β-diol-17-one can be prepared by reacting 16-[(1-piperidyl)methylene]-9(11)-etiocholen-3α - ol - 17 - one with N-bromoacetamide in the presence of perchloric acid in dioxane solution.

16-[(1-piperidyl)methylene] - 9α - bromoetiocholane-3α,11β-diol-17-one can be caused to react upon heating with anhydrous potassium acetate in dioxane-alcohol solution to give 16-[(1-piperidyl)methylene] - 9β,11β-epoxyetiocholan-3α-ol-17-one, and the latter in turn can be caused to react with anhydrous hydrogen fluoride in chloroform solution to give 16-[(1-piperidyl)methylene]-9α-fluoroetiocholane-3α,11β-diol-17-one.

Example 69

16-[(1-piperidyl)methylene] - 4 - androsten - 17 - one can be prepared by replacing the 16-hydroxymethyleneandrostan-3β-ol-17-one in Example 1 by a molar equivalent amount of 16-hydroxymethylene-4-androsten-17-one.

Example 70

16-[(1-piperidyl)methylene]androstan - 5- ol - 17-one can be prepared by replacing the 16-hydroxymethyleneandrostan-3β-ol-17-one in Example 1 by a molar equivalent amount of 16-hydroxymethyleneandrostan-5-ol-17-one.

Example 71

16-[(1-piperidyl)-n-butylidene]androstan - 3β - ol - 17-one [I; R is CH₃CH₂CH₂, R' is H, X is H₂, Y and Y' are CH₃, N=B is N(CH₂)₅] can be prepared by replacing the 16-hydroxymethyleneandrostan - 3β - ol - 17 - one in Example 1 by a molar equivalent amount of 16-butyryl-androstan-3β-ol-17-one.

Example 72

16-[(1-piperidyl)methylene] - 4,4 - dimethyl - 5 - androstene-3,17-dione can be prepared by replacing the 16-hydroxymethyleneandrostan-3β-ol-17-one in Example 1 by a molar equivalent amount of 16-hydroxymethylene-4,4-dimethyl-5-androstene-3,17 - dione 3 - monoethylene glycol ketal, and finally cleaving the ketal grouping by treating it with dilute acetic acid.

Example 73

16-[(1-piperidyl)methylene] - 4 - methyl - 5 - androstene - 3,17 - dione can be prepared by replacing the 16-hydroxymethyleneandrostan - 3β - ol - 17 - one in Example 1 by a molar equivalent amount of 16-hydroxymethylene-4-methyl-5-androstene - 3,17 - dione 3 - monoethylene glycol ketal, and finally cleaving the ketal grouping by treating it with dilute acetic acid.

Example 74

16-[(1 - piperidyl)methylene] - 19 - norandrostane-3,17-dione [I; R is H, R' is H, X is H₂, Y is CH₃, Y' is H, N=B is N(CH₂)₅] can be prepared by replacing the 16-hydroxymethyleneandrostan-3β-ol-17 - one in Example 1 by a molar equivalent amount of 16-hydroxymethylene - 19 - norandrostane - 3,17 - dione 3-monoethylene glycol ketal, and finally cleaving the ketal grouping by treating it with dilute acetic acid.

Example 75

2,16-bis[1-(1 - pyrrolidyl)ethylidene] - 4 - androstene-3,17-dione [V; R is CH₃, X is H₂, Y and Y' are CH₃, N=B is N(CH₂)₄] can be prepared by replacing the 2,16 - bishydroxymethylene - 4 - androstene - 3,17-dione in Example 27 by a molar equivalent amount of 2,16-diacetyl-4-androstene-3,17-dione.

Example 76

2,16-bis[(1 - pyrrolidyl)methylene] - 6α - methyl - 4-androsten-11β-ol-3,17-dione can be prepared by replacing the 2,16-bishydroxymethylene-4-androstene - 3,17 - dione in Example 27 by a molar equivalent amount of 2,16-bishydroxymethylene-6α-methyl-4-androsten - 11β-ol - 3,17-dione.

Example 77

2,16 - bis[(1 - pyrrolidyl)methylene] - 4 - androstene-3,11,17-trione [V; R is H, X is O, Y and Y' are CH₃, N=B is N(CH₂)₄] can be prepared by replacing the 2,16-bishydroxymethylene-4-androstene-3,17-dione in Example 27 by a molar equivalent amount of 2,16-bishydroxymethylene-4-androstene-3,11,17-trione.

Example 78

2,16 - bis[(1 - pyrrolidyl)methylene] - 6 - fluoro - 4-androstene-3,11,17-trione can be prepared by replacing the 2,16-bishydroxymethylene-4-androstene-3,17-dione in Example 27 by a molar equivalent amount of 2,16-bishydroxymethylene-6-fluoro-4-androstene-3,11,17-trione.

Example 79

2,16 - bis[(1-pyrrolidyl)methylene]etiocholane-7β,14α-diol-3,17-dione can be prepared by replacing the 2,16-bishydroxymethylene-4-androstene-3,17-dione in Example 27 by a molar equivalent amount of 2,16-bishydroxymethyleneetiocholane-7β,14α-diol-3,17-dione.

Example 80

2,16 - bis[(1 - pyrrolidyl)methylene] - 18,19 - bisnor-4-androstene-3,17-dione [V; R is H, X is H₂, Y and Y' are H, N=B is N(CH₂)₄] can be prepared by replacing the 2,16-bishydroxymethylene-4-androstene-3,17-dione in Example 27 by a molar equivalent amount of 2,16-bishydroxymethylene-18,19-bisnor-4-androstene-3,17-dione.

Example 81

16 - [(1 - piperidyl)methylene] - 3,5 - cycloandrostan-6-ol-17-one can be prepared by replacing the 16-hydroxymethyleneandrostan-3β-ol-17-one in Example 1 by a molar equivalent amount of 16-hydroxymethylene-3,5-cycloandrostan-6-ol-17-one.

Example 82

16 - [(1 - piperidyl)methylene]-Δ⁶-3,5-cycloandrosten-17-one can be prepared by replacing the 16-hydroxymethyleneandrostan-3β-ol-17-one in Example 1 by a molar equivalent amount of 16-hydroxymethylene-Δ⁶-3,5-cycloandrosten-17-one.

Example 83

16 - [(1 - piperidyl)methylene] - 2α - methyl - 4-androstene-3,17-dione can be prepared by reacting 2α-methyl-5-androstene-3,17-dione 3 - monoethylene glycol ketal (prepared by oxidizing 2α-methyl-5-androsten-17β-ol-3-one ethylene glycol ketal with chromic oxide in pyridine) with ethyl formate in the presence of sodium methoxide, and reacting the resulting 16-hydroxymethylene derivative with piperidine according to the manipulative procedure described above in Example 1, followed by hydrolyzing the ketal group by heating with dilute acetic acid.

Example 84

16 - [(1-piperidyl)methylene]-4 - chloro-4-androstene-3,17-dione can be prepared by reacting 4-chloro-4-androstene - 3,17 - dione 3 - monoethylene glycol (prepared by oxidizing 4-chloro-5-androsten-17β-ol-3-one ethylene glycol ketal with chromic oxide in pyridine) with ethyl formate in the presence of sodium methoxide, and reacting the resulting 16-hydroxymethylene derivative with piperidine according to the manipulative procedure described above in Example 1, followed by hydrolyzing the ketal group by heating with dilute acetic acid.

Example 85

16 - [(1 - piperidyl)methylene] - 9β,11β - epoxy - 4-androstene-3,17-dione can be prepared by reacting 9β,11β-epoxy-4-androstene - 3,17 - dione 3 - monoethylene glycol ketal with ethyl formate in the presence of sodium methoxide, and reacting the resulting 16-hydroxymethylene derivative with piperidine according to the manipulative procedure described above in Example 1, followed by hydrolyzing the ketal group by heating with dilute acetic acid.

16 - [(1 - piperidyl)methylene] - 9β,11β - epoxy - 4-androstene-3,17-dione can be caused to react with hydrofluoric acid, hydrochloric acid or hydrobromic acid to give, respectively, 9α-fluoro-, 9α-chloro- or 9α-bromo-16-[(1-piperidyl)methylene]4-androsten-11β-ol-3,17 - dione. The latter can be oxidized with chromic oxide in pyridine solution to give the corresponding 11-oxo compounds.

I claim:

1. A 17-oxo-steroid having from seventeen to about twenty-three carbon atoms exclusive of ester radicals and being further substituted in the 16-position by the grouping =C(R)—N=B wherein N=B is selected from the group consisting of primary amino, and basic secondary and tertiary amino having a molecular weight less than about 200, and R is selected from the group consisting of hydrogen and lower-alkyl.

2. A compound selected from the group consisting of (A) compounds having the formula

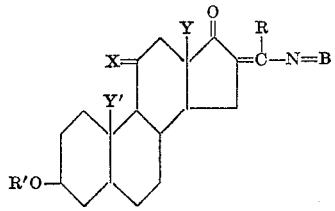

wherein R represents a member of the group consisting of hydrogen and lower-alkyl; R' represents a member of the group consisting of hydrogen and carboxylic acyl; X represents a member of the group consisting of H₂, (H)(OH) and O; Y and Y' represent members of the group consisting of hydrogen and methyl; and N=B is selected from the group consisting of primary amino, and basic secondary and tertiary amino having a molecular weight less than about 200; (B) acid-addition salts thereof; and (C) lower-alkyl, lower-alkenyl and monocarbocyclic aryl-lower-alkyl quaternary ammonium salts thereof.

3. A compound according to claim 2 in which a double bond is present in the 5,6-position of the steroid nucleus.

4. 16-(di-lower-alkylaminomethylene)androstan-3β-ol-17-one.

5. 16-(1-polymethyleniminomethylene)androstan - 3β-ol-17-one, wherein the polymethylenimino group has from 5 to 7 ring members.

6. A compound according to claim 5 in which a double bond is present in the 5,6-position.

7. 16 - (1 - polymethyleniminomethylene)etiocholan-3α-ol-11,17-dione, wherein the polymethylenimino group has from 5 to 7 ring members.

8. 16 - (di-lower-alkylamino-lower-alkylaminomethylene)-androstan-3β-ol-17-one.

9. 16-[(1-piperidyl)methylene] androstan-3β-ol-17-one.

10. 16-[(1 - pyrrolidyl)methylene]etiocholan - 3α-ol-11,17-dione.

11. 16-[(1 - pyrrolidyl)methylene]-5-androsten-3β-ol-17-one.

12. 16-[(1 - pyrrolidyl)methylene]androstan-3β-ol-17-one.

13. 16-(dimethylaminomethylene)androstan - 3β-ol-17-one.

14. 16-(cyclohexylaminomethylene)androstan - 3β-ol-17-one.

15. 16 - [(2 - diethylaminoethylamino)methylene]androstan-3β-ol-17-one.

16. 16-[2 - (4 - morpholinyl)ethylaminomethylene] androstan-3β-ol-17-one.

17. 16 - [(1 - hexamethylenimino)methylene]etiocholan-3α-ol-11,17-dione.

18. A compound selected from the group consisting of (A) compounds having the formula

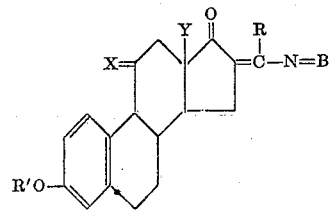

wherein R represents a member of the group consisting of hydrogen and lower-alkyl; R' represents a member of the group consisting of hydrogen, lower-alkyl and carboxylic acyl; X represents a member of the group consisting of H₂, (H)(OH) and O; Y represents a member of the group consisting of hydrogen and methyl; and N=B is selected from the group consisting of primary amino, and basic secondary and tertiary amino having a molecular weight less than about 200; (B) acid-addition salts thereof; and (C) lower-alkyl, lower-alkenyl and monocarbocyclic aryl-lower-alkyl quaternary ammonium salts thereof.

19. A 3,17-dioxo-steroid having from seventeen to about twenty-one carbon atoms exclusive of ester radicals and being further substituted in both the 2- and 16-positions by the grouping =C(R)—N=B wherein N=B is selected from the group consisting of primary amino, and basic secondary and tertiary amino having a molecular weight less than about 200, and R is selected from the group consisting of hydrogen and lower-alkyl.

20. A compound selected from the group consisting of (A) compounds having the formula

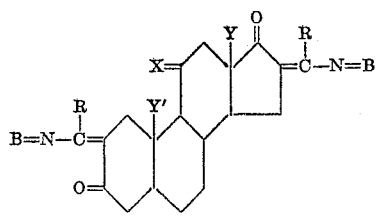

wherein R represents a member of the group consisting of hydrogen and lower-alkyl; X represents a member of the group consisting of $H_2$, (H)(OH) and O; Y and Y' represent members of the group consisting of hydrogen and methyl; and N=B is selected from the group consisting of primary amino, and basic secondary and tertiary amino having a molecular weight less than about 200; (B) acid-addition salts thereof; and (C) lower-alkyl, lower-alkenyl and monocarbocyclic aryl-lower-alkyl quaternary ammonium salts thereof.

21. A compound according to claim 20 in which a double bond is present in the 4,5-position of the steroid nucleus.

22. 2,16 - bis(di-lower-alkylaminomethylene) - 4 - androstene-3,17-dione.

23. 2,16 - bis(1 - polymethyleniminomethylene) - 4-androstene-3,17-dione, wherein the polymethylenimino group has from 5 to 7 ring members.

24. 2,16 - bis[(1 - pyrrolidyl)methylene]-4-androstene-3,17-dione.

25. The process for preparing a 17-oxo-steroid having from seventeen to about twenty-three carbon atoms exclusive of ester radicals and being further substituted in the 16-position by the grouping =C(R)—N=B wherein N=B is selected from the group consisting of primary amino, and basic secondary and tertiary amino having a molecular weight less than about 200, and R is selected from hydrogen and lower-alkyl, which comprises reacting a 17-oxo-steroid, having from seventeen to about twenty-three carbon atoms exclusive of ester radicals and being further substituted in the 16-position by the grouping =C(R)—OH, with a compound of the formula HN=B.

26. The process for preparing a compound having the formula

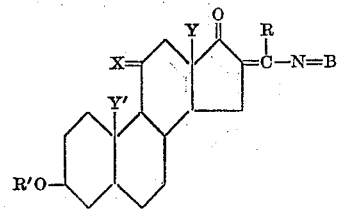

wherein R represents a member of the group consisting of hydrogen and lower-alkyl; R' represents a member of the group consisting of hydrogen and carboxylic acyl; X represents a member of the group consisting of $H_2$, (H)(OH) and O; Y and Y' represent members of the group consisting of hydrogen and methyl; and N=B is selected from the group consisting of primary amino, and basic secondary and tertiary amino having a molecular weight less than about 200, which comprises reacting a compound having the formula

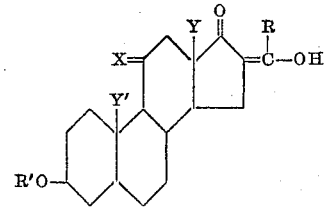

with a compound of the formula HN=B.

27. The process according to claim 26 in which a double bond is present in the 5,6-position of the steroid nucleus.

28. The process for preparing a 3,17-dioxo-steroid having from seventeen to about twenty-one carbon atoms exclusive of ester radicals and being further substituted in both the 2-and 16-positions by the grouping =C(R)—N=B wherein N=B is selected from the group consisting of primary amino, and basic secondary and tertiary amino having a molecular weight less than about 200, and R is selected from hydrogen and lower-alkyl, which comprises reacting a 3,17-dioxo-steroid, having from seventeen to about twenty-three carbon atoms exclusive of ester radicals and being further substituted in both the 2- and 16-positions by the grouping $$=C(R)—OH$$

with a compound of the formula HN=B.

29. The process for preparing a compound having the formula

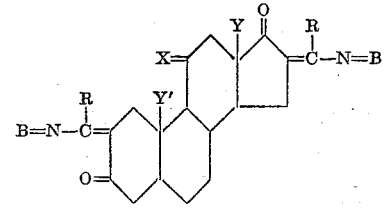

wherein R represents a member of the group consisting of hydrogen and lower-alkyl; X represents a member of the group consisting of H2, (H)(OH) and O; Y and Y' represent members of the group consisting of hydrogen and methyl; and N=B is selected from the group consisting of primary amino, and basic secondary and tertiary amino having a molecular weight less than about 200, which comprises reacting a compound having the formula

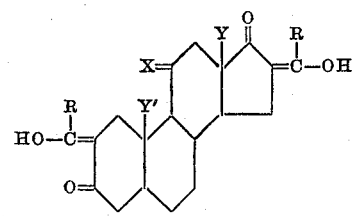

with a compound of the formula HN=B.

30. The process according to claim 29 in which a double bond is present in the 4,5-position of the steroid nucleus.

No references cited.